United States Patent [19]
Teplyakov et al.

[11] 4,119,606
[45] Oct. 10, 1978

[54] COLD-SETTING MOULDING MIXTURE FOR PRODUCING FOUNDRY MOULDS AND CORES

[76] Inventors: Sergei Dmitrievich Teplyakov, Seleznevskaya ulitsa, 13, kv. 3; Sergei Semenovich Zhukovsky, Profsojuznaya ulitsa, 17, korpus 1, kv. 15; Abram Moiseevich Lyass, Sharikopodshipnikovskaya ulitsa, 2, kv. 42; Zoya Vasilievna Belyakova, Nizhegorodskaya ulitsa, 7, korpus 3, kv. 14; Maiya Grigorievna Pomerantseva, Sadova-Spasskaya ulitsa, 19, kv. 6; Nina Yakovievna Tsygankova, ulitsa Marxa-Engelsa, 8, kv. 64; Mira-Ljudmila Solomonovna Krol, Storozhevaya ulitsa 31, kv. 20, all of Moscow, U.S.S.R.

[21] Appl. No.: 660,937

[22] Filed: Feb. 24, 1976

Related U.S. Application Data

[63] Continuation-in-part of Ser. No. 391,275, Aug. 24, 1973, abandoned, and a continuation-in-part of Ser. No. 557,525, Mar. 12, 1975, abandoned, which is a continuation of Ser. No. 458,982, Mar. 8, 1974, abandoned.

[51] Int. Cl.² .......................... C08K 5/54; C08K 9/06
[52] U.S. Cl. ........................... 260/38; 164/43; 260/DIG. 40; 260/42.15
[58] Field of Search .............. 260/DIG. 40, 38, 42.15, 260/448.8 R; 164/43

[56] References Cited
U.S. PATENT DOCUMENTS

| | | | |
|---|---|---|---|
| 3,184,814 | 5/1965 | Brown | 164/43 X |
| 3,328,450 | 6/1967 | Plueddemann | 260/448.8 R |
| 3,485,797 | 12/1969 | Robins | 260/38 X |
| 3,639,654 | 2/1972 | Robins | 260/DIG. 40 |
| 3,853,935 | 12/1974 | Roshdy et al. | 260/448.8 R |

*Primary Examiner*—Sandra M. Person
*Attorney, Agent, or Firm*—Holman & Stern

[57] ABSTRACT

A cold-setting moulding mixture, comprising a resin binder capable of setting at room temperature in the presence of an acid catalyst. The composition of the cold-setting mixture incorporates also phenoxyalkylalkoxysilane introduced as an additive add having the formula

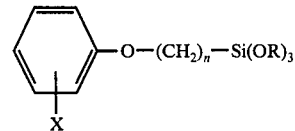

where "X" is selected from a hydrogen, alkyl-, alkoxy-group and the $-O(CH_2)_n-Si(OR)_3$ group, "n" = 2–3 and R is a $C_1-C_4$ alkyl radical. The additive is introduced in an amount of from 0.1 to 1.0% by weight of resin.

6 Claims, No Drawings

COLD-SETTING MOULDING MIXTURE FOR PRODUCING FOUNDRY MOULDS AND CORES

This application is a continuation-in-part of application Ser. No. 557,525, filed Mar. 12, 1975; which was a continuation of application Ser. No. 458,982, filed Mar. 8, 1974, which was a continuation of application Ser. No. 391,275, filed Aug. 24, 1973, all of which are now abandoned.

The present invention relates to cold-setting moulding mixtures for producing foundry moulds and cores; it may find extensive application in mechanical engineering, machine-tool building and in other fields of foundry practice where there is a need for high-quality steel and iron castings.

The term cold-setting mixture is used here and hereafter to denote a self-hardening moulding mixture using synthetic resin as a binder, said synthetic resin being capable of setting at room temperature in the presence of an acid catalyst.

The enhancement of physicomechanical characteristics of foundry moulds and cores is one of the most crucial problems in foundry practice. One of possible trends in coping with this problem envisages the introduction into the composition of the resin binder of organosilicon monomers (silanes) as an additive.

According to GFR Pat. No. 1252853, to provide an enhanced strength the resin binder is modified with aminosilanes. The silanes employed for that purpose have the general formula R'Si(OR)$_3$, where R' is a C$_2$-C$_6$ alkyl radical in which the alkyl group is replaced with an amino-group or a lower alkylamino group, while R is a lower alkyl group. γ-aminipropyltriethoxysilane having the formula NH$_4$(CH$_2$)$_3$Si(OC$_2$H$_5$)$_3$ may be given as an example of the silane used according to the aforesaid GFR Patent.

However, the use of aminosilanes suffers from a number of disadvantages. Thus, the maximum strengthening effect is attained at the expense of higher consumption of aminosilanes which must be taken in an amount of about 1–2% by weight of the resin binder. Moreover, the strength of a sand-resin moulding mixture incorporating aminosilances starts rising after 30–40 min, whereas in practice the technique of producing cores adopted in large-lot and mass production calls for the attainment of a high strength after 10–15 min. upon filling a core box.

It should be also noted that peculiar to aminosilanes is another serious disadvantage — their toxicity, which requires special precautions to be taken when dealing with silanes.

According to U.S. Pat. No. 3734936, in order to enhance the tensile strength of foundry moulds and cores the composition of a sand-resin mixture using carbamide-formaldehyde-furan resin as a binder, incorporated silane having the formula X—R'—Si(OR")$_3$ wherein R' is a short-chain alkylene radical, R" is aryl, alkyl, substituted aryl or furfuryl, and X - amino-mercaptoepoxy or glycidoxy-groups.

It is worth noting that the binding composition described in said patent comprises a large amount of furyl alcohol (up to 98% by weight) which, as is known, falls into a family of costly and scarce products. The introduction of silanes of the above types into the moulding sand using this binder adds still more to its cost. Therefore the potential field of application of the proposed moulding mixture is limited for economical considerations.

According to another U.S. Pat. No. 3403721 when producing foundry moulds and cores from a sand mixture comprising an alkyd-isocyonate binder, use is made of silane having the formula

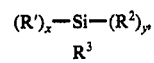

where X = 0–1; Y = 2 or preferably 3, the sum of X and Y being equal to 3; R' is a C$_1$-C$_4$ alkyl radical; R$^2$ is a C$_1$-C$_5$ alkoxy-radical; R$^3$ is aminoalkyl-, hydroxyalkyl-, sulphohydryl-alkyl, carboxyalkyl or aminoalkyl radical having from 1 to 8 carbon atoms in each of said alkyl radicals.

The disadvantage of the above binder based on isocyanate and a corresponding co-reagent, such as, alkyd resin modified with oil, resides in its low strength at elevated temperatures which limits the use of the moulding mixture, comprising the binder of that type, to the production of thin-walled castings from iron and non-ferrous alloys. The use of silanes of the above types as additives provides but small improvement in the strength of the moulding mixture which cannot thereby be employed in producing heavy thick-section iron and steel castings.

The main object of the present invention is to provide a method of producing foundry moulds and cores from a sand-resin moulding mixture which would enable a considerable increase in the strength of these moulds and cores both at room and high temperatures.

Another object of the invention is to provide a moulding mixture which would ensure rapid cold setting of foundry moulds amd cores enabling the use of high-speed automatized machines.

Still another object of the invention is to enhance the strength of moulds and cores at high temperatures which would make them suitable for producing heavy thick-section steel and iron castings.

There is proposed a cold-setting mixture for producing foundry moulds and cores, comprising a refractory filler, a binder which is a synthetic resin, such as, phenol-formaldehyde, resorcinol formaldehyde, phenol-furan, carbamide-formaldehyde, phenol-carbamide-formaldehyde, carbamide-furan, a cold-setting catalyst which may constitute aromatic sulphonic and mineral acids, which mixture is improved by using phenoxyalkylalkoxysilane as an additive, said phenoxyalkylalkoxysilane having the formula:

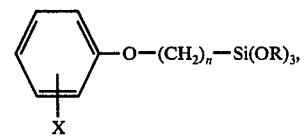

where "X" is selected from the group consisting of hydrogen, alkyl-, alkoxy groups and a —O(CH$_2$)$_n$Si(OR)$_3$ group, "n"=2–3 and R is a C$_1$-C$_4$ alkyl radical.

To make the essence of the present invention more fully apparent given hereinbelow is the description of exemplary embodiments illustrating the processing of producing of such cold-setting moulding mixtures.

However, at first, characteristic features of materials employed in these examples will be considered.

For the filler, quartz, zircon, chromite or aluminosilicate sands with an average grain size ranging from 0.1 to 0.4 mm can be used.

Synthetic resins capable of setting at room temperature in the presence of an acid catalyst, such as phenol-formaldehyde, resorcinol-formaldehyde, phenol-furan, carbamide-formaldehyde, phenol-carbamide-formaldehyde or carbamide-furan resins may be used as a binder.

It is expedient that the cold-setting catalyst employed be aromatic sulphonic and mineral acids. Paratoluenesulphonic acid, benzenesulphonic acid, parachlorobenzenesulphonic acid may be cited as examples of aromatic sulphonic acids. Aromatic sulphonic acids are usually added as aqueous or aqueous-alcohol solutions of 50 to 70% by weight concentration. Examples of mineral acids employed according to the present invention as catalysts include orthophosphoric, hydrochloric and sulfuric acids. These acids are usually added as aqueous solutions of 30 to 85% by weight concentration. Salts of heavy metals — aluminium, ferric, tin chlorides, etc., may be also used as catalysts.

The silane employed according to this invention is siliceous aromatic ether obtained by hydrosilation of allylaryl ethers with a Spayer catalyst

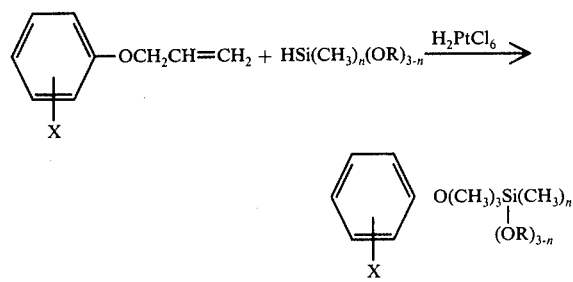

wherein "X" is hydrogen, alkyl-, alkoxy-groups and a —O(CH$_2$)$_n$Si(OR)$_3$ group; R is C$_1$-C$_4$ alkyl radical, "$n$" = 2-3.

Thus, for preparing γ-phenoxypropyltriethoxysilane a mixture containing 0.15 mole of allylphenylether and 0.15 mole of triethoxysilane in the presence of 0.15 ml of 0.1 normal solution of H$_2$PtCl$_6$.6H$_2$O in isopropyl alcohol was heated to a temperature of 80°-100° C during 10-15 hrs. Upon distilling of light boiling fractions γ-phenoxypropyltriethoxysilane with a boiling point of 116°-118° was isolated.

According to the present invention, use can be made of the following silanes:

γ- phenoxypropyltriethoxysilane

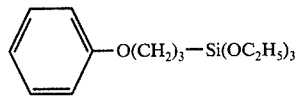

γ- /ortho-methylphenoxy/propyltriethoxysilane

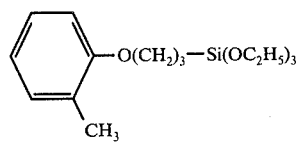

γ- /ortho-ethoxyphenoxy/propyltriethoxysilane

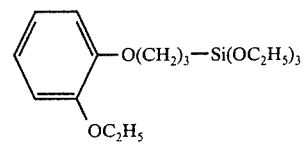

di-γ-triethoxysilylpropylresorcinol ether

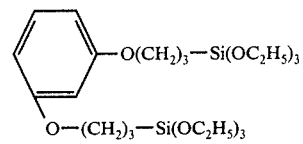

If desired, there may be used other phenoxyalkylalkoxysilanes corresponding to the general formula.

The greatest effect is achieved by adding phenoxyalkylalkoxysilane in an amount of from 0.1 to 1.0% by weight of resin.

According to the present invention, said silane may be introduced either into a binder (resin) or into a sand-resin mixture. However, better results are obtained when adding it to the resin. The silane may be introduced into the resin having an ambient temperature or preheated to a temperature of 50°-60° C; the latter being more efficient.

The introduction of said silane offers a 2-3-fold increase in thermostability of the moulding mixture and, hence, improves its high-temperature strength, ensuring thereby a possibility of producing thick-section steel and iron castings, enhancing their surface finish and diminishing mixture liability to finning.

A sand-resin mixture using silane as an additive can be prepared by making use of sands with a higher clay content which is inadmissible for moulding mixtures which do not comprise silane, since it may reduce considerably their hardening rate.

The maximum total amount of the resin binder present in the mixture amounts to 3% by weight of sand. The amount of the acid catalyst varies from 20 to 75% by weight of the resin binder.

The present invention may be illustrated by the following exemplary embodiments thereof.

EXAMPLE 1

100 parts by weight of quartz sand were mixed with 65% aqueous-alcohol solution of paratoluenesulphonic acid amounting to 1.2% by weight of the sand, and with phenol formaldehyde resin taken in an amount of 2% by weight of the sand and produced by condensing 1 mole of phenol and 1.2 moles of formaldehyde in the presence of magnesium oxide at a condensing temperature of 70°-75° C.

Altogether five moulding mixtures were prepared. Added to the first, second and the third mixture, according to the present invention, was 0.5, 0.1 and 1.0% (by weight of the resin) of γ-phenoxypropyltriethoxysilane. The fourth mixture which was prepared not in accordance with this invention, but for the purpose of comparison with the first three mixtures, comprised an additive of γ-aminopropyltriethoxysilane taken in an amount of 2.0% by weight of the resin. Finally, the fifth mixture was prepared without silane whatsoever.

When considered in detail, the process of preparing the moulding mixture comprises the following operations:

(a) adding silane to synthetic resin capable of setting at room temperature in the presence of an acid catalyst, and intermixing of said ingredients to produce a homogeneous composition;

(b) introducing an acid catalyst into a refractory material acting as a filler, and their intermixing;

(c) adding the refractory material and acid catalyst, included into said homogeneous composition, to the mixture and their intermixing for producing a sand-resin mixture ready for use.

The properties of these mixtures are tabulated in Table 1.

Table 1

| Properties of mixtures | Mix 1 | Mix 2 | Mix 3 | Mix 4 | Mix 5 |
|---|---|---|---|---|---|
| Duration of hardening until setting of the specimen, min | 20 | 25 | 20 | 40 | 45 |
| Compression strength, kgf/cm$^2$: | | | | | |
| after 1 hr | 19,5 | 13.0 | 23.0 | 10.0 | 7.0 |
| after 2 hrs | 40.5 | 30.0 | 52.0 | 25.5 | 15.0 |
| after 4 hrs | 55.0 | 42.0 | 70.0 | 41.0 | 20.0 |
| after 24 hrs | 74.0 | 58.0 | 88.0 | 56.0 | 25.0 |
| Thermostability at 1200° C, s. | 90 | 65 | 100 | 56 | 30 |

In this case and in the following examples, thermostability of a sand-resin mixture ws determined by means of hollow cylindrical specimens 50 mm high with an outside diameter of 30 mm and an inside diameter of 10 mm. On being prepared the specimens were held for 24 hrs, whereupon they were placed into the clamps of a "Ditert" dilatometer and loaded so that the pressure acting on each specimen amounted to 4 kgf/cm$^2$. Then an oven heated to a temperature of 1200° C was pushed on the specimens and a time period elapsed until their failure was determined in seconds.

As is seen from Table 1, the sand-resin mixture prepared according to the present invention (mixtures 1, 2 and 3) are superior in compression strength to that using aminosilane (mixture 4) and all the more so to mixture 5 which does not contain any silane whatsoever. The difference becomes especially manifest in the initial hardening period, the mixture prepared according to the invention featuring better strength characteristics in all subsequent hardening stages.

EXAMPLE 2

Mixtures Nos. 6, 7 and 8 are prepared, their composition and method of manufacturing being already described in Example 1. The only difference consists in that γ-phenoxypropyltriethoxysilane is replaced with the following silanes added each in an amount of 0.5% by weight of the resin:

γ-/ortho-methylphenoxy/propyltriethoxysilane (mix No. 6);

γ-/ortho-ethoxyphenoxy/propyltriethoxysilane (mix No. 7);

di-γ-triethoxysilylpropyl resorcinol ether (mix No. 8).

The properties of these mixtures are given in Table 2.

Table 2

| Properties of mixtures | Mix No.6 | Mix No.7 | Mix No 8 |
|---|---|---|---|
| Duration of hardening till extraction of the specimen, min. | 18 | 19 | 19 |

Table 2-continued

| Properties of mixtures | Mix No.6 | Mix No.7 | Mix No.8 |
|---|---|---|---|
| Compression strength, kgf/cm$^2$: | | | |
| after 1 hr | 26.5 | 23.0 | 22.0 |
| after 2 hrs | 38.5 | 42.0 | 38.0 |
| after 4 hrs | 45.5 | 54.0 | 65.0 |
| after 24 hrs | 64.0 | 70.0 | 82.0 |

EXAMPLE 3

Mixtures Nos. 9, 10 and 11 are prepared by mixing 100 parts by weight of quartz sand with phenol furan resin, taken in an amount of 2% by weight of the sand and obtained by condensing 1 mole of phenol, 1.2 moles of formaldehyde and 2 moles of furfuryl alcohol, and with highly-concentrated paratoluenesulphonic acid (of at least 90 percent by weight concentration) taken in an amount of 0.6% by weight of the sand.

The mixture No. 9, prepared according to the invention, comprised γ-phenoxypropyltriethoxysilane amounting to 0.5% by weight of the resin. The mixture No. 10, that did not correspond to the present invention, contained γ-aminopropyltriethoxysilane taken in an amount of 0.5% by weight of the resin, and the mixture No. 11 did not comprise silane at all.

The sequence of operations in preparing the above mixtures was similar to that used in Example 1, the only difference residing in that use was made of a mixing device providing high speed of intermixing of mixture ingredients (the speed of rotation of a shaft with blades was 800 rpm).

The properties of the mixtres are presented in Table 3.

Table 3

| Properties of mixtures | Mix 9 | Mix 10 | Mix 11 |
|---|---|---|---|
| Duration of hardening till extraction of the specimen, min | 30 | 60 | 90 |
| Compression strength, kgf/cm$^2$ | | | |
| after 1 min. | 9.0 | 5.0 | 3.5 |
| after 24 hrs | 105.0 | 68.0 | 45.0 |
| Thermostability at 1200° C, s | 100 | 89 | 42 |

EXAMPLE 4

Similarly to Example 3, three different mixtures were prepared. To this end 100 parts by weight of quartz sand were mixed with an acid catalyst which was an 85% aqueous solution of orthophosphoric acid taken in an amount of 0.6% by weight of the sand, and with carbamide formaldehyde furan resin amounting to 2% by weight of the sand and obtained by condensing 1 mole of carbamide, 2 moles of formaldehyde and 1.1 moles of furfuryl alcohol. The mixture No. 12 prepared according to the present invention, comprised γ-phenoxypropyltriethoxysilane taken in an amount of 0.5 by weight of the resin. The mixture No. 13 prepared not in compliance with the present invention but for the purpose of comparison, comprised -aminipropyltriethoxysilane amounting to 0.5% by weight of the resin. The mixture No. 14 was prepared without a silane additive. The properties of these mixtures are tabulated in Table 4.

Table 4

| Properties of mixtures | Mix 12 | Mix 13 | Mix 14 |
|---|---|---|---|
| Duration of hardening till extraction of the specimen, min | 2 | 3 | 6 |
| Compression strength, kgf/cm$^2$: | | | |
| after 1 min | 1.91 | 2.6 | 1.5 |
| after 24 hrs | 118 | 95 | 74 |

Table 4-continued

| Properties of mixtures | Mix 12 | Mix 13 | Mix 14 |
|---|---|---|---|
| Thermostability at 1200° C, s | 15 | 12 | 3 |

What we claim is:

1. A cold-setting moulding mixture for producing foundry moulds and cores comprising essentially a refractory filler, a binder which is synthetic resin capable of setting at room temperature in the presence of an acid catalyst, an acid catalyst selected from the group consisting of mineral and aromatic sulphonic acids, said mixture being improved by adding to it phenoxyalkylalkoxysilane having the formula

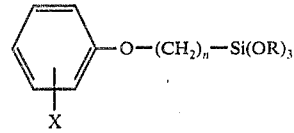

wherein "X" is selected from the group consisting of hydrogen, alkyl-, alkoxy-group and a $-O(CH_2)_n Si(OR)_3$ group, "$n$" 2–3 and R is a $C_1$–$C_4$ alkyl radical.

2. A mixture of claim 1, wherein said phenoxyalkylalkoxysilane is present in an amount of from 0.1 to 1.0% by weight of the binder.

3. A mixture of claim 1, wherein said phenoxyalkylalkoxysilane is γ-phenoxypropyltriethoxysilane.

4. A mixture of claim 1, wherein said phenoxyalkylalkoxysilane is di γ-triethoxysilylpropyl resorcinol ether.

5. A mixture of claim 1, wherein said phenoxyalkylalkoxysilane is γ-/ortho-methylphenoxy/propyltriethoxysilane.

6. A mixture of claim 1, wherein said phenoxyalkylalkoxysilane is γ-/ortho-ethoxyphenoxy/propyltriethoxysilane.

* * * * *